Patented July 7, 1942

2,289,229

UNITED STATES PATENT OFFICE 2,289,229

BITUMINOUS COMPOSITION

David R. Wiggam, West Grove, Pa., assignor to Hercules Powder Company, Wilmington, Del., a corporation of Delaware No Drawing. Application April 6, 1938, Serial No. 200,450

10 Claims. (Cl. 106—191)

This invention relates to bituminous compositions and more particularly to bituminous compositions containing ethyl cellulose.

The various bituminous substances such as, for example, coal tar, gilsonite, stearine pitch, etc. have found wide commercial use due to their excellent water-proofing properties. As a class, however, they all have either one or the other, or both, of two rather serious defects. One of these defects is a tendency to soften and flow at summer atmospheric temperature. The other is a tendency to brittleness at normal and lower than normal temperatures.

I have found that ethyl cellulose has the effect of increasing the melting point and greatly increasing the toughness of the various bituminous materials, even when present in relatively small proportions. Thus, by the addition of ethyl cellulose to bituminous material, I can obviate, to a large extent, their two most serious defects.

The compositions in accordance with this invention will comprise a bituminous material homogeneously admixed with ethyl cellulose. The relative amounts of the bituminous material and of ethyl cellulose which I may use will depend upon the extent to which it is desired to alter the characteristics of the bituminous material. The weight of ethyl cellulose used will, in general, be less than the weight of bituminous material used and for many purposes the relative proportion of the ethyl cellulose will be much smaller.

Bituminous materials are usually defined as a class of native or pyrogenous substances containing bituminous or pyrobituminous, or resembling them in their physical properties. The composition in accordance with this invention may contain any of these substances homogeneously admixed with ethyl cellulose. The bituminous material which I may use may be, for example, gilsonite, coal tar, pine tar, stearine pitch, coal tar pitch, Trinidad asphalt, Mexican crude petroleum asphalt, Mexican crude blown petroleum asphalt, etc.

The ethyl cellulose which I may use may have a wide range of viscosities, although, in general, I prefer to use a comparatively high viscosity type. I may use, for example, an ethyl cellulose having a viscosity characteristic within the range of about 3-4 seconds to about 500 seconds, although, in general, I prefer to use one having a viscosity characteristic within the range of about 6-8 seconds to about 60-80 seconds. I may utilize an ethyl cellulose having an ethoxy content within the range of about 44% to about 49.5% by weight, and, in general, prefer one having an ethoxy content within the range of about 46% to about 48% by weight.

The ethyl cellulose and bituminous material may be homogeneously admixed by dissolving the ethyl cellulose in the bituminous material, provided the molten bituminous material is a solvent for ethyl cellulose. Bituminous materials which are rich in aromatic hydrocarbons, esters and/or alcohols, when in the molten condition, are solvents for ethyl cellulose. Examples of such bituminous materials are gilsonite, coal tar, pine tar, stearine pitch, etc.

The bituminous materials which are rich in straight chain hydrocarbons, when in the molten condition, are not solvents for ethyl cellulose. Ethyl cellulose may, however, be dissolved in such bituminous materials, when in the molten condition, by the aid of a suitable flux. Bituminous materials which require the aid of a flux to dissolve ethyl cellulose are, for example, coal tar pitch, Trinidad asphalt, Mexican crude petroleum asphalt, etc. The flux used to dissolve ethyl cellulose in normally non-solvent bituminous materials may be any substantially non-volatile material which, in the molten condition, is a solvent for ethyl cellulose, such as, for example, rosin, modified and unmodified non-heat convertible phenol-formaldehyde resins, the higher fatty acids, as, stearic acid, linseed oil fatty acids, castor oil fatty acids, etc., waxes, as, montan wax, beeswax, Japan wax, etc., the bituminous materials rich in aromatic hydrocarbons, esters and/or alcohols mentioned hereinbefore, etc. The amount of the solvent flux used will depend upon its solvent activity for ethyl cellulose, but will ordinarily be used in amount within the range of about 50 to about 75%, by weight, of the mixture of the solvent and non-solvent materials present.

The compositions in accordance with this invention may also be prepared by dissolving ethyl cellulose and a bituminous material in a mutual solvent, such as, for example, a mixture of 80% toluol and 20% butanol, and the solvent evaporated. Homogeneous admixtures of ethyl cellulose and a bituminous material can be obtained in this way with both the solvent and the non-solvent types of bituminous materials.

The compositions in accordance with this invention may contain various modifying agents such as, plasticizers, waxes, resins and fillers in addition to ethyl cellulose and the bituminous material. The plasticizers which are suitable for use in the composition in accordance with this invention are, for example, triphenyl phosphate, dibutyl phthalate, chlorinated diphenyl, castor oil, hydrogenated ethyl abietate, hydrogenated methyl abietate, ethyl abietate, methyl abietate, etc. Suitable waxes are, for example, montan wax, beeswax, Japan wax, Carnauba wax, etc. Suitable resins are, for example, modified and unmodified non-heat convertible phenol-formaldehyde type resins, Boea resin, cumarone-indene synthetic resins, rosin, etc. Fillers which may be used are, for example, wood flour, ground cotton linters, clays, zinc oxide, corn proteins, etc. The particular modifying ingredients added and their amount will depend upon the purpose for which the completed plastic is to be used.

The compositions in accordance with this invention, details for their preparation and their properties in comparison with the unmodified bituminous materials, are illustrated by the following tables:

TABLE I
*Heat-fusion mixtures of ethyl cellulose and gilsonite*

| | Example No. | | | | | |
|---|---|---|---|---|---|---|
| | 0 | 1 | 2 | 3 | 4 | 5 |
| Gilsonite | 100 | 95 | 90 | 75 | 66⅔ | 50. |
| Ethyl cellulose med. viscosity | 0 | 5 | 10 | 25 | 33⅓ | 50. |
| Fused at | | 200° C | 200° C | 240° C | 240° C | 240° C. |
| Mutual solubility | | Good | Good | Good | Good | Good. |
| Softening pt. drop method | 142.0° C | 167.0° C | 166.0° C | 176.5° C | 198.5° C | 206.0° C. |
| Melting pt. drop method | 158.5° C | 174.5° C | 172.5° C | 195.5° C | 208.5° C | 218.0° C. |
| Casts | Good | Good | Good | Good | Good | Too viscous. |

TABLE II
*Heat-fusion mixtures of ethyl cellulose and coal tar*

| | Example No. | | | | |
|---|---|---|---|---|---|
| | 0 | 6 | 7 | 8 | 9 |
| Coal tar | 100 | 990 | 75 | 66⅔ | 50. |
| Ethyl cellulose med. viscosity | 0 | 10 | 25 | 33⅓ | 50. |
| Fused at | | 170° C | 170° C | 170° C | 200° C. |
| Mutual solubility | | Good | Good | Good | Good. |
| Softening pt. drop method (Barrett's) | 22.5° C | 67.5° C | 95.0° C | 119° C | 143.0° C. |
| Melting pt. drop method (Barrett's) | 27.5° C | 88.0° C | 118° C | 132.0° C | 171.0° C. |
| Casts | Too soft | Too soft | Excellent | Excellent | Excellent. |

TABLE III
*Heat-fusion mixtures of ethyl cellulose and stearine pitch*

| | Example No. | | | | | |
|---|---|---|---|---|---|---|
| | 0 | 10 | 11 | 12 | 13 | 14 |
| Stearine pitch | 100 | 99 | 90 | 75 | 66⅔ | 50. |
| Ethyl cellulose high viscosity | 0 | 1 | 10 | 25 | 33⅓ | 50. |
| Fused at | | 200° C | 200° C | 200° C | 215° C | 250° C. |
| Mutual solubility | | Fair | Fair | Fair | Fair | Fair. |
| Softening pt. drop method | 75.0° C | 95.0° C | 100.0° C | 133.0° C | 148.0° C | 172.0° C. |
| Melting pt. drop method | 85.0° C | 106.0° C | 120.0° C | | 163.0° C | 182.0° C. |
| Casts | Too soft | Too soft | Too soft | Sticky | Good | Brittle. |

TABLE IV
*Heat-fusion mixtures of ethyl cellulose, coal tar pitch and a flux*

| | Example No. | | | | |
|---|---|---|---|---|---|
| | 0 | 15 | 16 | 17 | 18 |
| Coal tar pitch (Barrett's Roofing pitch) | 100 | 96 | 96 | 97 | 97 |
| Vinsol* | 0 | 2 | 2 | 3 | 3 |
| Ethyl cellulose low viscosity | 0 | 0 | 1 | 3 | 3 |
| Softening pt. drop method °C | 63.0 | 67.0 | 70.0 | 92.0 | 78.0 |
| Melting point drop method °C | 71.0 | 71.0 | 74.5 | 98.0 | 81.0 |

*A gasoline-insoluble resin obtained from pine wood.

TABLE V

Heat-fusion mixtures of ethyl cellulose and coal tar

| | Example No. | | |
|---|---|---|---|
| | 19 | 20 | 21 |
| Ethyl cellulose low viscosity type. | 40% by wt. | 40% by wt. | 40% by wt. |
| Rosin modified maleate (Amberol 800). | 6% by wt. | 15% by wt. | 30% by wt. |
| Refined coal tar | 54% by wt. | 45% by wt. | 30% by wt. |
| Blending temperature | 210° C. | 210° C. | 210° C. |
| Time required to blend. | 2 hours. | 2 hours. | 1 hr. 50 min. |
| Solubility | Good | Good | Good. |
| Gloss | Good | Good | Good. |
| Casting properties | Fair viscous. | Fair viscous. | Fair viscous. |
| Color | Black. | Black. | Black. |
| Tack | Tack free. | Tack free. | Tack free. |
| Melting range | 132° C. | 130-134° C. | 130-134° C. |
| Impact strength (charpy). | 2.59 ft. lb. | 2.34 ft. lb. | 0.80 ft. lb. |
| Cold flow | 0.085 mm. | 0.26 mm. | 0.09 mm. |
| Pfund hardness | 34.0 | 40.0 | 138.0. |

Examples of compositions in accordance with this invention suitable for specific purposes are illustrated by the following:

EXAMPLE 22

Insulating composition

|  | Per cent |
|---|---|
| Ethyl cellulose (low viscosity type) | 25 |
| Gilsonite | 65 |
| Castor oil (Baker's No. 15) | 10 |

EXAMPLE 23

Lacquer composition for impregnating cloth

|  | Per cent |
|---|---|
| Ethyl cellulose (high viscosity type) | 3.0 |
| Coal tar (Barrett's melting point) | 17.0 |
| Carbon tetrachloride | 68.0 |
| Butanol | 2.4 |
| Toluol | 9.6 |

EXAMPLE 24

Sealing composition for blasting caps

| | |
|---|---|
| Ethyl cellulose (medium viscosity) parts | 5.0 |
| Rosin (color grade of N) do | 34.4 |
| Coal tar (Barrett's melting point) do | 129.6 |
| Crude montan wax do | 8.0 |
| Hydrogenated methyl abietate do | 16.0 |
| Saybolt furol viscosity at 150° C. secs | 43 |
| Melting point, ring and ball method °C | 64.6-63.5 |
| Penetration at 25° C., 100 g., 5 sec | 67-65 |

EXAMPLE 25

Heat-fusion mixtures of ethyl cellulose, Trinidad asphalt and a flux

The following homogeneous mixture was prepared using a flux:

|  | Per cent by weight |
|---|---|
| Ethyl cellulose (low viscosity type) | 10 |
| Wood rosin (color grade of N) | 40 |
| Trinidad asphalt | 40 |

The ethyl cellulose was dissolved in melted rosin at a temperature of 175° C. When completely dissolved, the asphalt was added to the hot molten mixture and blended in at 175° C. When cast and cooled, the final mixture was found to be homogeneous and free of lumps or granules of gelled or precipitated ethyl cellulose.

EXAMPLE 26

Heat-fusion mixtures of ethyl cellulose, Mexican crude petroleum asphalt and a flux The following mixture was prepared by the procedure described in Example 25:

|  | Per cent by weight |
|---|---|
| Ethyl cellulose (low viscosity type) | 10 |
| Rosin | 50 |
| Mexican crude partially blown petroleum asphalt (180° F. softening point) | 40 |

When cast and cooled this mixture was found to be homogeneous and free of lumps or granules of gelled or precipitated ethyl cellulose.

The details and examples given herein are by way of illustration and not by way of limitation of the invention as broadly described and claimed.

What I claim and desire to protect by Letters Patent is:

1. A composition of matter comprising in homogeneous admixture a bituminous material selected from the group consisting of coal tar, pine tar, gilsonite, and stearine pitch; and ethyl cellulose, the composition consisting of non-volatile substances and having a higher softening point and greater toughness than the bituminous material.

2. A composition of matter comprising in homogeneous admixture a bituminous material selected from the group consisting of coal tar, pine tar, gilsonite, and stearine pitch; and ethyl cellulose in a quantity less than that of the bituminous material, the composition consisting of non-volatile substances and having a higher softening point and greater toughness than the bituminous material.

3. A composition of matter comprising coal tar and ethyl cellulose in homogeneous admixture, the composition consisting of non-volatile substances and having a higher softening point and greater toughness than the coal tar.

4. A composition of matter comprising pine tar and ethyl cellulose in homogeneous admixture, the composition consisting of non-volatile substances and having a higher softening point and greater toughness than the pine tar.

5. A composition of matter comprising stearine pitch and ethyl cellulose in homogeneous admixture, the composition consisting of non-volatile substances and having a higher softening point and greater toughness than the stearine pitch.

6. A composition of matter consisting essentially of a bituminous material selected from the group consisting of coal tar, pine tar, and stearine pitch; and ethyl cellulose in homogeneous admixture therewith, the composition having a higher softening point and greater toughness than the bituminous material.

7. A composition of matter consisting of a bituminous material selected from the group consisting of coal tar, pine tar, gilsonite, and stearine pitch; and ethyl cellulose in homogeneous admixture therewith in a quantity less than that of the bituminous material, the composition having a higher softening point and greater toughness than the bituminous material.

8. A composition of matter consisting in homogeneous admixture of coal tar and ethyl cellulose in a quantity less than that of the coal tar, the composition being characterized by stability and by a higher softening point and a greater toughness than the coal tar.

9. A composition of matter consisting in homogeneous admixture of pine tar and ethyl cellulose in a quantity less than that of the pine tar, the composition being characterized by stability and by a higher softening point and a greater toughness than the pine tar.

10. A composition of matter consisting in homogeneous admixture of stearine pitch and ethyl cellulose in a quantity less than that of the stearine pitch, the composition being characterized by stability and by a higher softening point and a greater toughness than the stearine pitch.

DAVID R. WIGGAM.